United States Patent [19]

Kinsinger et al.

[11] 4,087,005

[45] May 2, 1978

[54] APPARATUS FOR VIEWING A PRESELECTED ONE OF A PLURALITY OF MEDIA STORED IN A CONTAINER

[75] Inventors: William C. Kinsinger, New York; James Ippolito, Bronx, both of N.Y.

[73] Assignee: Metagraphic Systems, Inc., Poughkeepsie, N.Y.

[21] Appl. No.: 717,923

[22] Filed: Aug. 26, 1976

Related U.S. Application Data

[63] Continuation-in-part of Ser. No. 467,134, May 6, 1974, Pat. No. 3,993,405.

[51] Int. Cl.² ............................................. B07C 5/00
[52] U.S. Cl. .................................. 209/80.5; 353/27 A
[58] Field of Search ........................... 209/80.5, 110.5; 353/26 R, 26 A, 27 R, 27 A

[56] References Cited

U.S. PATENT DOCUMENTS

| 3,743,400 | 7/1973 | Haning et al. | 353/26 |
| 3,908,829 | 9/1975 | Muller et al. | 209/80.5 |
| 3,930,992 | 1/1976 | Baumel et al. | 209/73 |
| 3,993,405 | 11/1976 | Kinsinger et al. | 353/27 A |

Primary Examiner—Allen N. Knowles
Assistant Examiner—Joseph J. Rolla
Attorney, Agent, or Firm—Lerner, David, Littenberg & Samuel

[57] ABSTRACT

Apparatus is provided for viewing a preselected one of a plurality of information-bearing media, such as microfilm in fiche format, from a container housing a plurality of such media. The apparatus includes a viewing area and clamps for removably receiving the microfilm container. Selection apparatus is provided for selecting one of the media from the container and moving it to the viewing area while the container is held in position on the frame. A movable carriage is provided for moving the selection apparatus and the selected media from the container into the viewing area.

24 Claims, 13 Drawing Figures

APPARATUS FOR VIEWING A PRESELECTED ONE OF A PLURALITY OF MEDIA STORED IN A CONTAINER

RELATED APPLICATIONS

This application is a continuation-in-part of application Ser. No. 467,134 filed on May 6, 1974, now U.S. Pat. No. 3,993,405.

FIELD OF THE INVENTION

This invention relates to film viewers, more particularly to apparatus for viewing a preselected one of a plurality of information-bearing media stored in a container, and even more particularly to such an apparatus which is capable of viewing a preselected one of a plurality of microfiche stored in a cartridge.

BACKGROUND OF THE INVENTION

Microfilming of records and other information is a wellaccepted practice. In many applications, microfilm is stored in roll form, while in other applications, microfilmed records are in the form of fiche which comprise individual film sheets surrounded by a rigidifying border. Such sheets are subdivided into frames identifiable by a particular "row" and "column" designation by which a particular frame can be selected for viewing above a light source by appropriate X-Y movement of the fiche.

To increase the capability of an information-retrieval system based on a microfiche format, it is further known to employ a plurality of such fiche in a container or cartridge and to preselectively withdraw a desired fiche for viewing from the cartridge. Such systems are disclosed in U.S. Pat. Nos. 3,124,260; 3,754,814; 3,092,144; 3,690,753; 3,442,581; 3,713,535; and 3,528,735. Various techniques, including magnetic attraction, mechanical picker arms, and other arrangements are suggested in these various prior patents for withdrawing the preselected fiche from a cartridge housing a plurality thereof. Such arrangements, however, are relatively complex and, consequently, expensive and, in addition, have the added drawback of requiring that the preselected fiche be completely withdrawn from its associated cartridge during the viewing process, thereby making it difficult to reinsert same into the cartridge after the viewing is complete. (See, for example U.S. Pat. No. 3,584,742 which requires the blowing of fluid into the cartridge to separate the remaining fiche sufficiently to permit the reinsertion of the fiche which has been withdrawn therefrom and other prior art techniques which require electrical apparatus to nullify the static electricity effect present in the cartridge when it is desired to reinsert the fiche after viewing.)

SUMMARY OF THE INVENTION

In contradistinction to the prior art, the instant invention provides a method and apparatus for viewing selected ones of a plurality of information-containing media, such as microfiche, stored in a container, commonly designated a magazine, in which the media selected for viewing is not completely withdrawn from the magazine associated therewith. Rather, during the viewing of a preselected medium, the trailing border area thereof remains interleaved between remaining ones of the plurality of media in the magazine such that when viewing of the selected medium is completed, it can be easily returned to its storage position in the magazine.

In accordance with the invention, the apparatus comprises a frame with the frame having a viewing area associated therewith, and means for removably receiving the magazine. Selection means are provided for selecting one of the media from the magazine and retaining the preselected one of the media in the viewing area while the magazine is held in position on the frame. First means are provided for moving the selected media from the magazine between first and second positions which includes the viewing area therebetween. Advantageously, once the fiche to be viewed is selected, it is only necessary to move it in one direction from the load position to the viewing position. Further, to return the selected fiche to the magazine, it is only necessary to move it in an opposite direction from the viewing position to the unload position. Accordingly, the amount of movement in the viewer has been minimized.

As a further feature of the invention, the selected media is carried on a movable carriage driven by a novel multi-function drive arrangement provided with overtravel capabilities such that the multi-function drive arrangement can perform additional functions before and after the media-supporting carriage has moved between its first and second positions. For example, and as will be described in greater detail, such multi-function drive means may initially urge a pressure plate (subsequently employed for maintaining the preselected medium in its viewing position) out of the path of the carriage before the carriage actually begins to move from the second to the first position. In like fashion, after the carriage has been moved to its first position, the multi-function drive means begins traveling to actuate the selection means to "pick" the preselected medium which is to be viewed, this latter operation taking place before the carriage begins its travel from its first position to its second position. Finally, after the carriage is moved to its second position, the multi-function drive means continues to travel in its second direction to disengage the aforementioned pressure plate and allow it to engage the selected medium for retaining same in the viewing position.

As a further feature of the invention, novel selection means, to be described in greater detail, is provided to select and retain the preselected medium in the viewing area. Such selection apparatus includes a plurality of selector keys supported in spaced-aligned relationship with each of the keys including a rearwardly-extending select-activating surface and a forwardly-extending picker-arm extension which will be actuated between a reset and select position in response to the select-activating surface being engaged. Actuating means, preferably in the form of a selector arm, is normally located at a first position, a first predetermined distance below the select-activating surfaces of each of the keys, with said actuating means being movable between a first position and a second position which is in engagement with the select-activating surfaces.

Accordingly, it is an object of the instant invention to provide apparatus for viewing one of a preselected plurality of medium stored in a magazine without the necessity of completely removing said preselected medium from said magazine and without the necessity of moving the magazine.

It is another object of the instant invention to provide apparatus for transferring a preselected one of a plurality of media from a container housing said media to a viewing area and back to a container wherein only a forward and reverse movement of the carriage-supporting media is required.

Still another object of the instant invention is to provide a method for viewing a selected one of the plurality of media stored in a container therefor, comprising the steps of selectively engaging for retention in a viewing area said one of said plurality of media; moving said selected media from a first position to a second position for viewing; and moving said media from said second position back to said first position; whereby said selected one of said plurality is only moved in one direction to load or unload.

Still another object of the instant invention is to provide such a method wherein the length of travel of said media from said second position to said first position is less than the length of said media; whereby the trailing edge of said preselected one of said media will remain interleaved between the remaining ones of said plurality when said container moves between its second and first positions.

Yet another object of the instant invention is to provide a novel apparatus for selecting media for use in the aforementioned viewing apparatus.

Still another object of the instant invention is to provide such a novel selection apparatus which can be actuated in a select mode during the overtravel of the aforementioned multi-function drive means associated with the carriage supporting the information-containing medium.

These and other objects of the instant invention may be further understood by reference to the detailed specification and drawings hereof.

DETAILED DESCRIPTION

Figure 1:
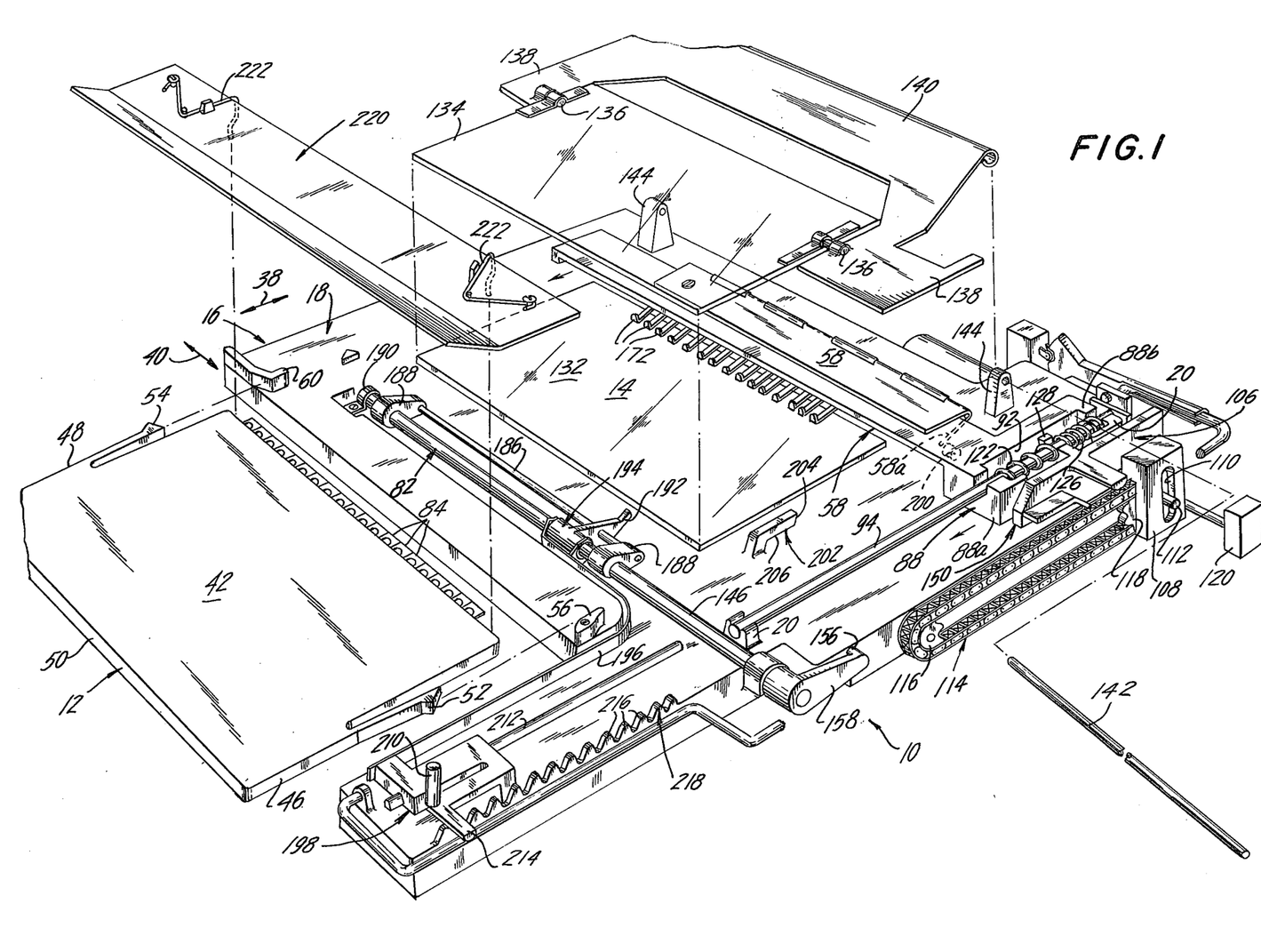
FIG. 1 is an exploded perspective view of the apparatus in accordance with the present invention.

Turning to the figures, wherein like numerals designate like elements, there is shown in FIG. 1, apparatus 10 for transferring a selected one of a plurality of information-bearing media, such as microfiche, from a magazine or cartridge 12 therefor to a viewing area 14 provided in a frame designated 16. Frame 16 may be slid forward and backward in the direction of double-headed arrow 38, while at the same time, the frame 16 can be moved side to side in the direction of double-headed arrow 40. Thus, with a preselected medium, such as a microfiche, retained in the viewing area 14 in the manner to be further described, the entire frame 16 and microfiche can be moved in transverse and longitudinal directions to preposition a selected "row" and "column" frame of such fiche with respect to a light source positioned therebeneath. In this connection, in addition to a light source, it will be appreciated that an overall microfiche film viewer incorporating the apparatus 10 hereof, would also include appropriate lenses, reflecting surfaces, screens, etc., well known in the art and forming no part of the instant invention.

As best seen in FIG. 1, cartridge 12 is basically a five-sided container having top and bottom surfaces 42 and 44, respectively, side surfaces 46 and 48, respectively, and a rear wall 50. Side surface 46 includes a generally L-shaped and flexible outstanding projection 52 for engaging an upstanding alignment projection 56, and side surface 48 includes a similar L-shaped outstanding projection 54 for engaging an upstanding alignment projection 60 when cartridge 12 is inserted into the apparatus 10 by being slid forward to lock the cartridge 12 in position. Once the cartridge 12 has been inserted in the aforedescribed manner into apparatus 10, in accordance with the invention, it is necessary to move a carriage 58 rearward from its first (forward) position shown in FIG. 2 to its second (rearward) position shown in FIG. 3 to withdraw a microfiche from cartridge 12. It should be noted that in passing between its first and second positions, the carriage 58 passes the viewing area 14 and thereby places the withdrawn microfiche in viewing area 14. In a manner to be further described, when carriage 58 is in the forward position, a selection means 82 engages an apertured tab 84 of a preselected fiche 76' which one wishes to view. Thus, the carriage 58 is moved to the rearward position, the preselected fiche 76' will be retained in the viewing area 14 in the manner shown in FIG. 3. Also to be described in greater detail is the manner in which the trailing edge 86 of the preselected fiche 76' remains interleaved between the remaining ones of the plurality of fiche 76 after the carriage 58 (and selected fiche 76') has been moved to the second rearward position (See FIG. 3).

With reference to FIG. 1, for effecting the aforedescribed movements, the carriage 58 is provided on one end thereof with a support block 88. Support block 88 includes a longitudinal passageway 92 extending therethrough by means of which support block 88 is freely slidable on a fixed shaft 94 secured between support plates 20. In this manner, by means of a multi-function drive member 106 to be described immediately below, the carriage 58 can be moved between its aforementioned first and second positions.

The multi-function drive member 106 is provided with a driven element 108 having a slot 110 formed therein adapted to receive a driving element 112 mounted on a chain drive 114. Chain drive 114 includes an idler sprocket 116 and a drive sprocket 118 mounted on the output shaft of a suitable reversible driving motor 120. Thus, rotation of the chain drive 114 in a first direction caused by appropriate energization of the motor 120 will cause the multi-function drive member 106 to travel in a first direction (for example, toward the front of the apparatus 10), whereas reverse energization of the motor 120 and corresponding reverse rotation of the chain drive 114 will cause the multi-function drive member 106 to travel toward the rear of the apparatus 10.

In further accord with the invention, an overtravel cooperative arrangement is established between the multi-function drive member 106 and the carriage 58 in order to permit the multi-function drive member 106 to perform functions in addition to moving the carriage 58 between its first and second positions at times both before and after the carriage 58 has been moved between its first and second positions. To effectuate such overtravel arrangement, it will be seen in FIGS. 1 to 3 that a first compressible spring 122 is centered about shaft 94 and is disposed intermediate an extension 128 and an outer wall 88a of block 88. In like fashion, a second compressible spring 126 is centered about shaft 94 and is disposed between extension 128 and outer wall 88b of block 88. Multi-function drive member 106 includes the inwardly directed driving extension 128 which engages compressible spring 122 or compressible spring 126 depending on the direction of travel of multi-function drive memeber 106, in turn dependent upon the direction of energization of reversible driving motor 120 in the manner aforedescribed.

Figure 2:
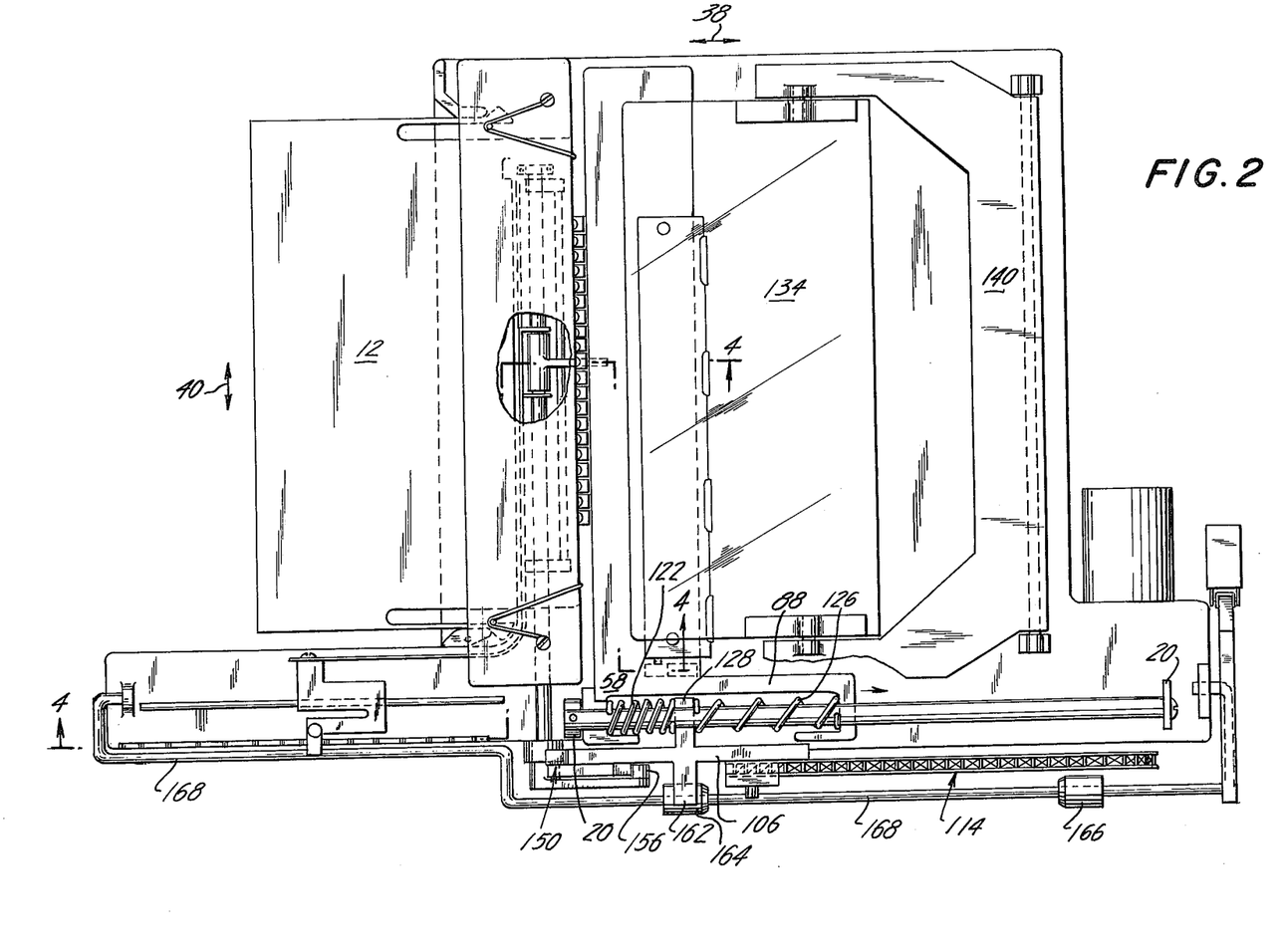
FIG. 2 is a top-plan view of the apparatus shown in FIG. 1 with the magazine in position on the apparatus and the carriage in its forward position to select a preselected microfiche.

Consider, for example, the status of the apparatus as depicted in FIG. 2, the start position. The carriage 58 is in its forward (first) position as established by the engagement of wall 88a of the support block 88 abutting one of the support plates 20. Multi-function drive member 106 is similarly in its forward position compressing first compressible spring 122. Assuming now that the driving motor 120 is energized in the appropriate direction, rotation of the chain drive 114 causes the multi-function drive member 106 to begin traveling toward the right as viewed in FIG. 2. It will be understood that as the drive extension 128 of multi-function drive member 106 disengages compressible spring 122, it expands to its full length, and drive extension 128 begins to engage and compress second compressible spring 126. However, even though the multi-function drive member 106 experiences this initial travel, it can be seen that the carriage 58 has not yet begun to travel from its first forward position toward the rear of the apparatus 10. A similar overtravel arrangement takes place when carriage 58 is in the rear position, and multi-function drive member 106 begins to move forward before carriage 58.

Figure 11:
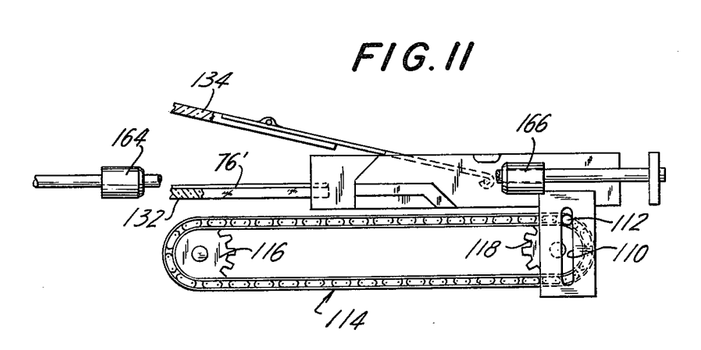

Initially, it should be noted that the viewing area 14 of the frame 16 carries a fixed lower glass platen 132, and above lower glass platen 132 is an upper glass pressure plate 134 loosely carried by pins 136 on the arms 138 of a generally U-shaped plate 140 pivotally mounted relative to blocks 144 by pins 142. (See FIG. 1.) Due to gravity, U-shaped plate 140 is normally biased counterclockwise about pins 142 such that the arms 138 normally maintain upper pressure plate 134 against the upper surface of lower glass platen plate 132 to as to sandwich the selected fiche 76' therebetween in the manner depicted also in FIG. 11. Accordingly, in order for carriage 58 to move forwardly to select a fiche 76, plate 134 must be lifted upwardly and separated from lower plate 132.

Figure 4:
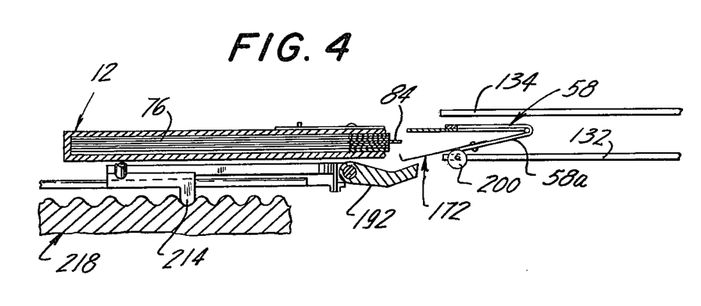
FIG. 4 is a partial sectional view illustrating the carriage in its forward position ready to select a preselected fiche.
Figures 5, 6:
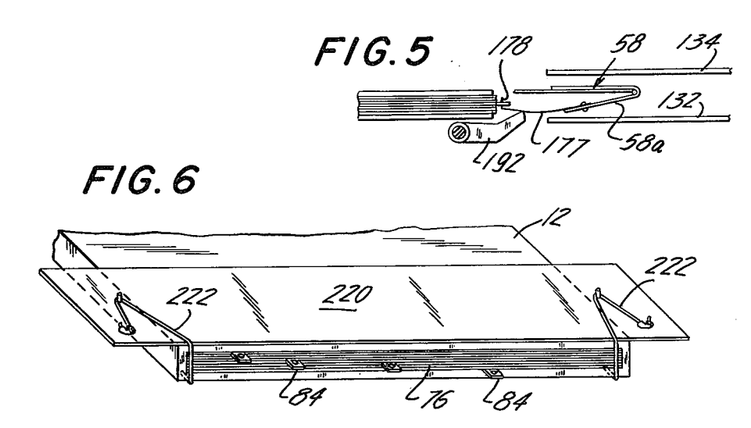
FIG. 5 is a partial sectional view illustrating the next step in the selection of a fiche.
FIGS. 6 and 7 are partial perspective views of the magazine and means for preventing the withdrawal of more than one fiche from the magazine.

As seen in FIG. 1, the multi-function drive member 106 also carries a multi-function cam 150 which, in addition to performing other functions in the selection apparatus, also functions to engage the pressure plate supporting arm 138 to drive same out of the path of travel of the carriage 58 during that initial travel of the multi-function drive member 106 from its rearward position, before the carriage 58 begins to move forward between its second and first positions. Thus, as seen in FIGS. 1, 3, 11, and 12, with the multi-function drive member 106 in its most rearward position in which the drive portion 128 thereof is compressing second compressible spring 126, the cam 150 of multi-function drive member 106 is not engaging the arm 138 carrying upper transparent pressure plate 134. However, during the initial travel of the multi-function drive member 106 to the left as viewed in FIGS. 1 and 12 (before the carriage 58 has experienced any movement), the multi-function cam 150 engages arm 138 and begins to drive same clockwise about pins 142. Of course, it should be appreciated that the upper pressure plate 134 must indeed be urged out of the path of movement of the carriage 58 so that it can be moved between the first and second positions as shown in FIGS. 4 and 5. By virtue of the engagement of drive extension 128 of multi-function drive member 106 against spring 122, it will be seen that continued forward motion of the multi-function drive member 106 will now cause the carriage 58 to be moved between its rearward position illustrated in FIGS. 1 and 3 and its forward position illustrated in FIG. 2. When carriage 58 reaches its forward (load-unload) position, illustrated in FIG. 2, the aforedescribed overtravel arrangement now permits the multi-function drive member 106 to continue traveling to the left, as viewed in FIG. 2, and the compressibility of spring 122 allows the multi-function drive member 106 to continue leftward movement without effecting further movement of carriage 58.

Figure 8:
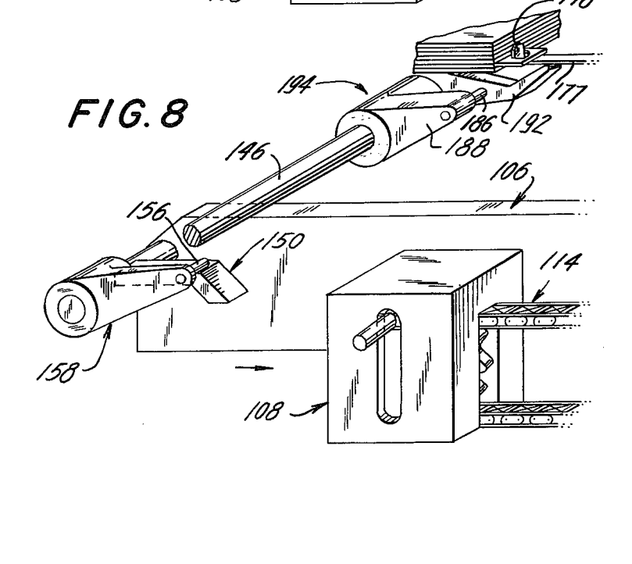
FIGS. 8 and 9 are partial perspective views of the selection apparatus illustrating the selection of a preselected fiche.
Figure 9:
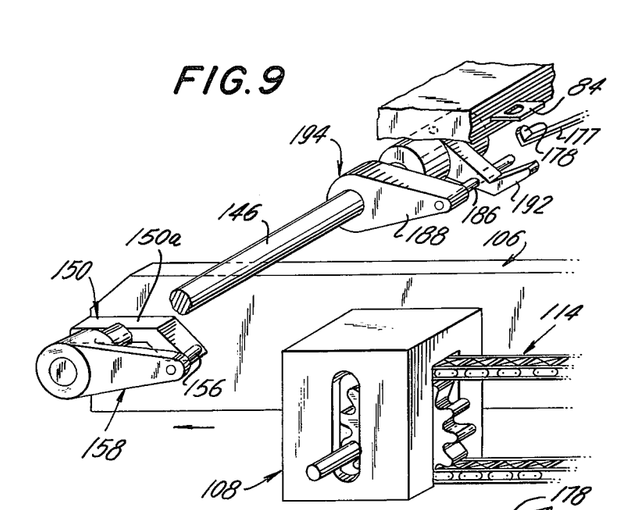
Figure 10:
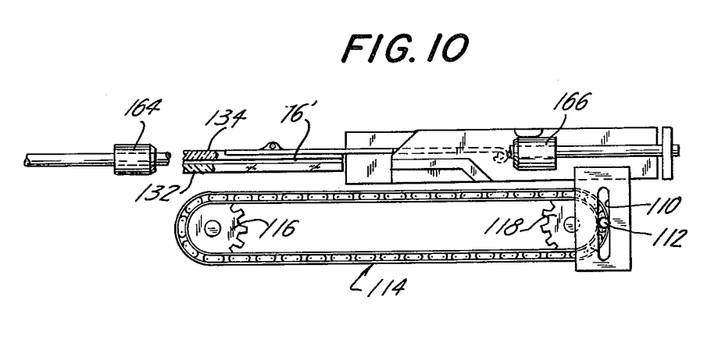
FIGS. 10 and 11 are partial side views illustrating the operation of the multi-function drive means with respect to actuating the upper pressure plate out of the path of movement of the carriage.

As will be explained in greater detail in connection with the detailed description of the selection apparatus 82, it is noted at this point, that during such overtravel motion in the forward position, the multi-function cam 150 of the multi-function drive member 106 engages a roller 156 of a selector-activating arm 158 fixedly carried by a shaft 146. This sequence of operation is shown in FIGS. 8 and 9 wherein cam 150 engages, operates, and then passes roller 156 provided on the selector-activating arm 158 which is normally biased to return to its home position illustrated in FIGS. 1 and 9. As will be described in greater detail, such clockwise rotation of arm 158 causes a resetting of the selection apparatus 82.

Figure 3:
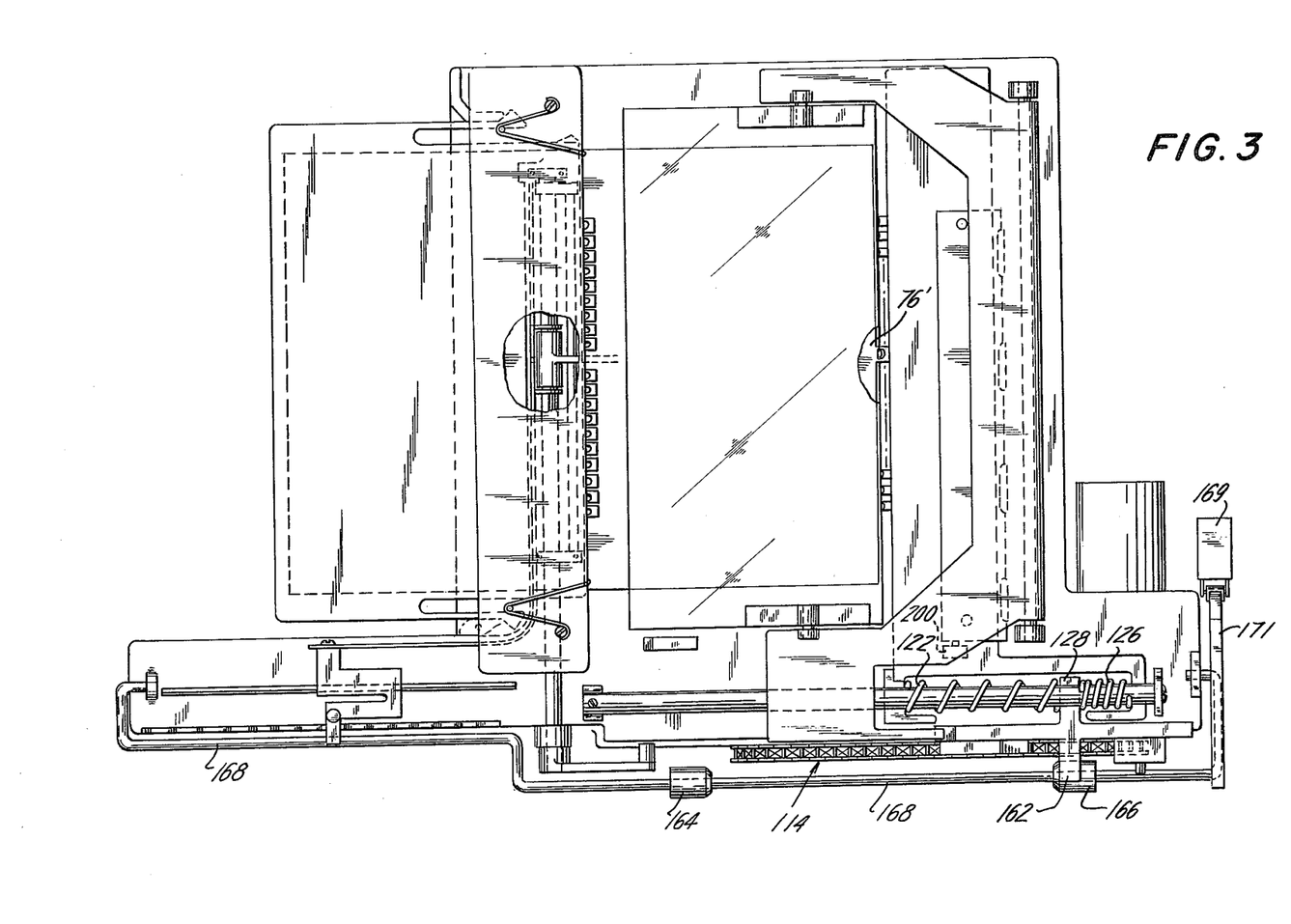
FIG. 3 is a top-plan view of the apparatus shown in FIG. 1 illustrating the carriage and selected fiche in the rearward viewing position of the apparatus.

As best seen perhaps in FIGS. 2 and 3, multi-function drive member 106 also includes an outwardly-extending projection 162 which cooperates with cam followers 164 and 166 supported on frame 16 by longitudinally-extending member 168. Forward overtravel of multi-function drive member 106 continues until projection 162 thereof engages cam follower 164, which pivots member 168 downwardly to actuate switch 169 via linkage 171. Switch 169 energizes driving motor 120 to rotate chain drive 114 about sprockets 116, 118 and in the opposite direction to cause multi-function drive member 106 to begin traveling back toward the right as viewed in FIGS. 2 and 3. Of course, during the initial rightward travel of the multi-function drive member 106 (FIG. 2), drive extension 128 has not as yet engaged compressible spring 126 such that carriage 58 has not yet begun traveling from the forward position back toward the rearward position at the rear of the apparatus 10. However, during such initial travel of the multi-function drive member 106 to the right, cam 150 thereof engages roller 156 of the select-activating arm 158. This sequence is shown in FIGS. 8 and 9 in which cam 150 engages roller 156, lifts same to rotate arm 158 counterclockwise about shaft 146, and then passes same. As will be further described in connection with the detailed operation of the select apparatus 82, it is the counterclockwise rotation of arm 158 that causes the select apparatus 82 to engage the preselected apertured tab 84 of the selected fiche 76' during the initial rightward travel of the multi-function drive member 106 which takes place before the carriage 58 begins moving from its first position shown in FIG. 2 to its second (viewing) position illustrated in FIG. 3.

With continued rightward movement of the multi-function drive member 106, driving extension 128 thereof then engages compressible spring 126 such that continued motion of the multi-function drive member 106 causes the carriage 58 and fiche 76' carried thereby to be moved toward the viewing position. As suggested previously, carriage 58 and fiche 76' continue moving to the right until the wall 88b of block 88 of carriage 58 engages rear stop plate 20. However, by virtue of the compressibility of spring 126, multi-function drive member 106 is permitted to continue its rightward motion such that its multi-function cam 150 disengages itself from the arm 138, and the upper pressure plate 134 rotates counterclockwise about pins 142 and drops downwardly to urge the selected fiche 76' against the upper surface of lower glass plate 132, in the manner shown in FIGS. 11 and 12. The rightward overtravel of the multi-function drive member 106 is illustrated in FIG. 3, it being understood that at this point in time, the outwardly-projecting extension 162 of the multi-function drive member 106 now engages the second microswitch 166 to deactivate the motor 120, and at the same time reset its mode of operation such that upon subsequent activation, it will begin rotating chain drive 114 in the opposite direction to reinstitute the aforedescribed process.

Summarizing this aspect of the invention, the overtravel arrangement established between the multi-function drive means 106 and the carriage 58 permits the multi-function drive means to initially urge the upper pressure plate 134 out of the path of motion of the carriage before the carriage begins to move between its second and first positions; permits the multi-function drive means to operate the selection apparatus in the select mode during the initial travel of the multi-function drive member in the rightward direction before the carriage begins its motion between its first and second positions; and, finally, permits the multi-function drive member 106 to disengage itself from the upper pressure plate 134 which urges the selected fiche 76' into the viewing position 14 after the fiche-bearing carriage has moved to its second (viewing) position.

Considering now the details of the selection apparatus 82, it will be seen from FIGS. 1 through 5, that the selection apparatus 82 includes a plurality of flexible select keys 172 mounted on the lower portion 58a of carriage 58 in spaced-apart aligned relationship. Each of the flexible keys 172 includes a rearwardly-extending select-activating surface 177 and an upwardly-extending picker arm extension 178 which will be biased between a lower reset position illustrated in FIGS. 4 and 9 and an upper select position illustrated in FIGS. 5 and 8 whenever the corresponding select-activating surface 177 is engaged. It will be appreciated that when a selected key 172 is biased clockwise such that the picker arm extension 178 thereof moves from its reset position of FIG. 9 to its select position of FIG. 8, that the picker arm extension 178 will pass through the apertured tab 84 of the fiche 76' which has been selected by virtue of the selection of the appropriate key 172, in a manner to be immediately described. It will also be appreciated that when the select-activating surface 177 is disengaged, the biased picker arm extension 178 will move from its upper select position illustrated in FIG. 8 back to its lower reset position illustrated in FIG. 9, and in so moving will pass out of any apertured tab 84 positioned thereabout.

To understand the operation of the selection apparatus 82, the interaction between a carriage-mounted roller 200 and a wedge 202 having a rear cam face 204 and a flat undersurface 206 must be explained. More particularly, the lower portion 58a of carriage 58 is spring mounted thereon so that lower portion 58a is normally biased upwardly, and as the selector keys 172 are mounted on the lower portion 58a, they are also spring biased upwardly. Accordingly, as carriage 58 moves forwardly between lower and upper plates 132, 134, carriagemounted roller 200 engages cam face 204 of wedge 202 which actuates lower-carriage portion 58a and selector keys 172 downwardly to their open position. The carriage 58 then continues to move forwardly as roller 200 rides along undersurface 206. Accordingly, selector keys 172 are brought into the load position at a point below the apertured tabs 84 of the microfiche cards 76, and one of the selector keys 172 is ready to be actuated upwardly to engage the apertured tab 84 of the selected fiche 76'.

To actuate the selector keys 172, there is provided a selector assembly 194 which includes an actuating shaft 186 carried by rocker arms 188 pivotally mounted on shaft 146, which shaft is rotatably carried by mountings 190 secured on planar member 18 of frame assembly 16. Selector assembly 194 also includes a selector arm 192 which is slidable along shafts 146 and 186, and is operated by a flexible member 196 which is adapted to be slidable along a channel. Flexible member 196 is operated by a selector member 198 having an upstanding handle 210. Selector member 198 is mounted to be moved along a guideway 212 and is also provided with an extension member 214 for engaging one of a plurality of slots 216 provided in a positioner 218. It will be understood that the number of slots 216 correspond to the number of microfiche cards 76' provided in each cartridge 12. Accordingly, to select, for example, fiche number 2, selector member 198 and extension 214 are moved into slot 216, designated number 2. The movement of selector member 198 slides flexible member 196 relative to its channel so that selector assembly 194 and selector arm 192 are brought into position below selector key 172 designated number 2. In this manner, when selector arm 192 is actuated upwardly, it will cause selector key number 2 to engage tab 84 of fiche number 2 so that fiche number 2 will be brought into the viewing position by carriage 58, as explained above.

The actuation of a selector key 172 will now be explained. As noted previously, it is during the initial travel of the multi-function drive member 106 toward the right (before the carriage 58 begins moving to the second position) that cam 150 thereof actuates roller 156 of the arm 158 in the counterclockwise direction to operate the select apparatus 82 in the select mode. This is further explained as follows. As the rear surface 150a of cam 150 engages roller 156 of arm 158, arm 159 rotates counterclockwise as shown in FIGS. 8 and 9 causing corresponding counterclockwise rotation of shaft 146, counterclockwise rotation of rocker arms 188 and corresponding counterclockwise rotation of actuating shaft 186. It should be noted, however, from FIG. 8, that the maximum counterclockwise rotation of actuating shaft 186 is insufficient to engage the select-activating surfaces 177 of all selector keys 172 and that, in fact, the only selector key 172 which will be actuated clockwise will be that selector key 172 which has positioned under its select-activating surface 177, the selector arm 192 of selector assembly 194.

Thus, to select a preselected fiche 76' for viewing, it is only necessary to actuate flexible member 196 and selector assembly 194 to move selector arm 192 under the select-activating surface 177 of the key 172 which when actuated upwardly will pick through the associated apertured tab 84 of the fiche 76' to be viewed. As the carriage 58 moves rearwardly, selector arm 192 maintains selector key 172 flexed upwardly. Then, carriage-mounted roller 200 slides out from under wedge 202, and lower-carriage portion 58a springs upwardly so that all of the selector keys 172 are brought upwardly to substantially the same position as the actuated-selector key. Then, with the selected fiche 76' engaged, carriage 58 moves to its rearward position for viewing. Thus, when the carriage 58 and the selector keys 172 move to the viewing position, the retained fiche 76', which has been "hooked" by the picker arm extension 178 of the actuated selector key 172, will remain in the viewing position, urged against lower plate 132 by pressure plate 134 and be capable of being viewed, as explained above.

Now, let it be assumed that the operator of the viewer wishes to view a different microfiche within the same cartridge 12. Once again, he activates appropriate selection mechanism 198 and the corresponding lateral movement of selector assembly 194 such that selector arm 192 will move from the previously selected key 172 to the new key 172 corresponding to the new microfiche 76' which the operator wishes to view. In this situation, after the carriage has once again moved from its second to its first position, the multi-function drive member 106 begins its overtravel in the rearward direction and will cause the counterclockwise rotation of the select-activating arm 158 and the rotation of the new selector key 172 from its reset to select position in which the corresponding picker arm extension 178 will pass through the apertured tab 84 of the new fiche 76' which has been selected for viewing.

Figure 12:
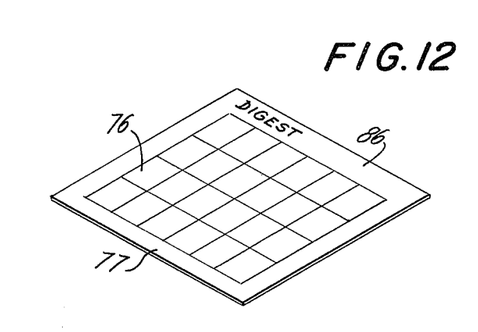
FIG. 12 is a plan view of a prior art microfiche.
Figure 13:
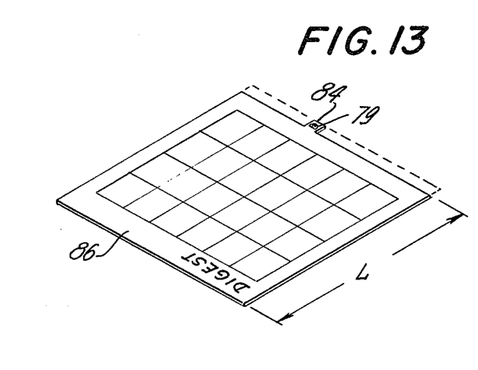
FIG. 13 is a plan view of one of the microfiche in accordance with the present invention stored in the magazine having an apertured tab thereon for selection purposes.

Turning to FIG. 12, there is shown a conventional fiche 76 which includes relatively narrow trailing border area 77 and a relatively wider title border area 86. In accordance with another aspect of the present invention, the apertured tab regions 84 employed herein are formed by removing all but the selected tab area 84 from the narrow trailing border portion 77 in the manner shown in FIG. 13 hereof. This step is performed in a punch press operation having cutting dies to remove the unwanted area and a punch to provide the aperture 79 in the tab region 84 which remains. This is a materially simpler process than adding a tab to the fiche whose dimensions are outlined in FIG. 12. Additionally, by simply laterally varying the position of the border region 77 in the punch press described above, the tabs 84 can be produced laterally offset from one another on the stacked fiche 76 stored in the cartridge 12 in the manner illustrated.

In further accord with the instant invention, the fiche 76 are inserted in the cartridge 12 in a reverse direction, that is, with the wider title portion 86 thereof to the rear of the cartridge. In this manner, and by choosing the distance between the first and second positions of the carriage and magazine to be less than the length of the fiche designated L in FIG. 14, the wider border area 86 of the selected fiche remains interleaved between the remaining ones of the fiche when the selected fiche 76' remains in the viewing area and the carriage 58 moves to its rearward position. By providing that the larger border area 86 remains interleaved in the cartridge, the film portion of the fiche 76 remains unobstructed for viewing. Moreover, as noted previously, because the border area 86 remains interleaved in the cartridge, there is no difficulty as is experienced in the prior art of attempting to insert the viewed fiche back into the cartridge 12 after viewing thereof is completed.

Figure 7:
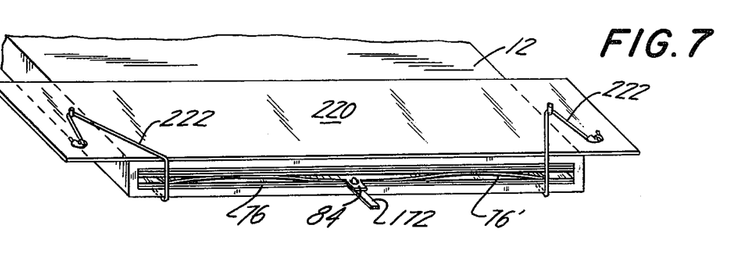

Turning now to FIGS. 6 and 7, there is shown improved means for insuring that only a single fiche 76' is withdrawn from cartridge 12, to thereby avoid the problem of a plurality of fiche 76 being withdrawn simultaneously. As will be more fully explained in a related application, a plate 220 is provided with spring-retaining members 222 which operate to apply pressure to the sides of a partially-withdrawn fiche 76' and thereby cause it to bow and separate from adjacent fiche 76, so that it may be easily withdrawn.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

What is claimed is:

1. Apparatus for transferring a preselected one of a plurality of media from within a container containing said media to a viewing position, comprising:
   a frame;
   said frame comprising a viewing position;
   container-receiving means for retaining a container in a fixed position relative to said viewing position;
   selection means for selecting a preselected one of the media retained in said container which is retained by said container-receiving means in said fixed position; and
   first means operatively associated with said selection means for moving said preselected one of said media from its position within said container to said viewing position and for returning said one media from said viewing position to its original position in said container, while said container remains in said fixed position.

2. The apparatus of claim 1 and further including a support base; said frame being movably mounted on said support base for motion in transverse directions with respect thereto.

3. The apparatus of claim 1 wherein said first means includes a media-supporting carriage movable between said first and second positions corresponding to the position of the container and the viewing position of said media.

4. The apparatus of claim 3 wherein said selection means includes selector keys mounted on said carriage and means on said carriage for actuating said keys to an open position.

5. The apparatus of claim 3 wherein said media has a predetermined length; the distance between said first and second positions of said media and said carriage, respectively, is less than the predetermined length of said media; whereby the trailing edge of said preselected one of said media will remain interleaved between remaining ones of said plurality of media when said carriage moves said media to said first position, and said selection means retains said preselected one of said media in said viewing position.

6. The apparatus of claim 3 wherein said first means further includes multi-function drive means for moving said carriage between said first and second positions.

7. The apparatus of claim 6 and further including reversible motive means for moving said multi-function drive means in opposite directions and further including switch means mounted on said frame and engaged by said multi-function drive means after a predetermined extent of travel of said multi-function drive means and after said carriage has moved to said first position for reversing and deactivating the operation of said motive means.

8. The apparatus of claim 6 and further including first overtravel means associated with said carriage and said multi-function drive means for permitting said multi-function drive means to experience initial travel in the direction of travel of said carriage between said first and second positions before said carriage begins to move between said first and second positions, and for permitting said multi-function drive means to continue moving after said carriage has been moved between said first and second positions; and wherein said selection means includes selector-activating means therefor.

9. The apparatus of claim 8 wherein said first overtravel means includes a compressible spring.

10. The apparatus of claim 8 wherein said selector-activating means includes means for being operated by said multi-function drive means after said carriage has been moved to said first position.

11. The apparatus of claim 8 wherein said multi-function drive means includes means for operating said selector-activating means during the initial travel of said multi-function drive means before said carriage begins to move between said first and second positions.

12. The apparatus of claim 8 further including a pressure plate movably secured to said frame for maintaining said preselected one of said media in said viewing position; and wherein said multi-function drive means includes means for engaging and driving said pressure plate out of the path of movement of said carriage during the initial travel of said multi-function drive means before said carriage begins to move between said second and first positions; and wherein said multi-function drive means disengages said pressure plate allowing it to return into said path of movement of said carriage after said carriage has been moved between said first and second positions.

13. The apparatus of claim 8 wherein said selection means includes:
a plurality of selector keys supported in spaced and aligned relationship on said carriage, each of said keys including a rearwardly-extending select-activating surface and a forwardly-extending picker-arm extension which is operable to be moved from a reset to a select position in response to said select-activating surface being engaged;
actuating means normally located at a first position and a first predetermined distance from the select-activating surfaces of each of said keys, said actuating means being movable between said first position and a second position in engagement with said select-activating surfaces;
a selector for selectively moving said actuating means relative to a preselected one of said select-activating surfaces to be engaged in response to said actuating means moving between said first and second positions; and
wherein said selector-activating means includes means for moving said actuating means between said first and second positions in response to said selector-activating means being engaged and operated by said multi-function drive means during the initial travel of said multi-function drive means before said carriage begins to move between its first and second positions.

14. The apparatus of claim 8 wherein said multi-function drive means includes a first cam surface which operates to engage said selector-activating means in a first direction after said carriage has been moved to said first position.

15. The apparatus of claim 8 and further including a pressure plate movably secured to said frame for maintaining said preselected one of said media in said viewing position.

16. The apparatus of claim 15 wherein said multi-function drive means includes means for engaging and moving said pressure plate out of the path of movement of said carriage during the initial travel of said multi-function drive means before said carriage begins to move to said first position.

17. The apparatus of claim 8 and further including a pressure plate movably secured to said frame for maintaining said preselected one of said media in said viewing position; and wherein said multi-function drive means includes a second cam surface operative to engage and drive said pressure plate out of the path of travel of said carriage during the initial travel of said multi-function drive means before said carriage begins to move to said first position.

18. The apparatus of claim 17 wherein said second cam surface operates to disengage said pressure plate allowing it to return to the path of movement of said carriage after said carriage has been moved to said second position.

19. The apparatus of claim 8 wherein said first overtravel means comprises a first compressible spring; wherein said carriage includes a first member; wherein said multi-function drive means includes an extension; said first compressible spring being interposed between said first carriage member and the extension of said multi-function drive means.

20. The apparatus of claim 19 and further including a carriage shaft fixedly secured to said frame, said carriage being slidably mounted for movement between its first and second positions on said shaft; said shaft passing freely through said first carriage member and through said first compressible spring.

21. The apparatus of claim 3 and further including overtravel means associated with said carriage and said multi-function drive means for permitting said multi-function drive means to experience initial travel in the direction of travel of said carriage between said second and first positions before said carriage begins to move between said second and first positions, and for permitting said multi-function drive means to continue moving after said carriage has been moved between said second and first positions.

22. The apparatus of claim 21 wherein said overtravel means includes a compressible spring.

23. The apparatus of claim 6 and further including reversible motive means for moving said multi-function drive means in opposite directions.

24. The apparatus of claim 23 and further including first-switch means mounted on said frame and engaged by said multi-function drive means after a predetermined extent of travel of said multi-function drive means and after said carriage has moved to said second position for reversing the operation of said motive means.

* * * * *

UNITED STATES PATENT AND TRADEMARK OFFICE
CERTIFICATE OF CORRECTION

PATENT NO. : 4,087,005
DATED : May 2, 1978

INVENTOR(S) : William C. Kinsinger and James Ippolito

It is certified that error appears in the above–identified patent and that said Letters Patent are hereby corrected as shown below:

Column 4, line 43, the words "the carriage" should read
    -- when carriage --.

Column 8, line 68, the number "159" should read -- 158 --.

Signed and Sealed this

Nineteenth Day of September 1978

[SEAL]

Attest:

RUTH C. MASON
Attesting Officer

DONALD W. BANNER
Commissioner of Patents and Trademarks